C. D. VAN ALLEN.
Churn.
No. 35,638.  Patented June 17, 1862
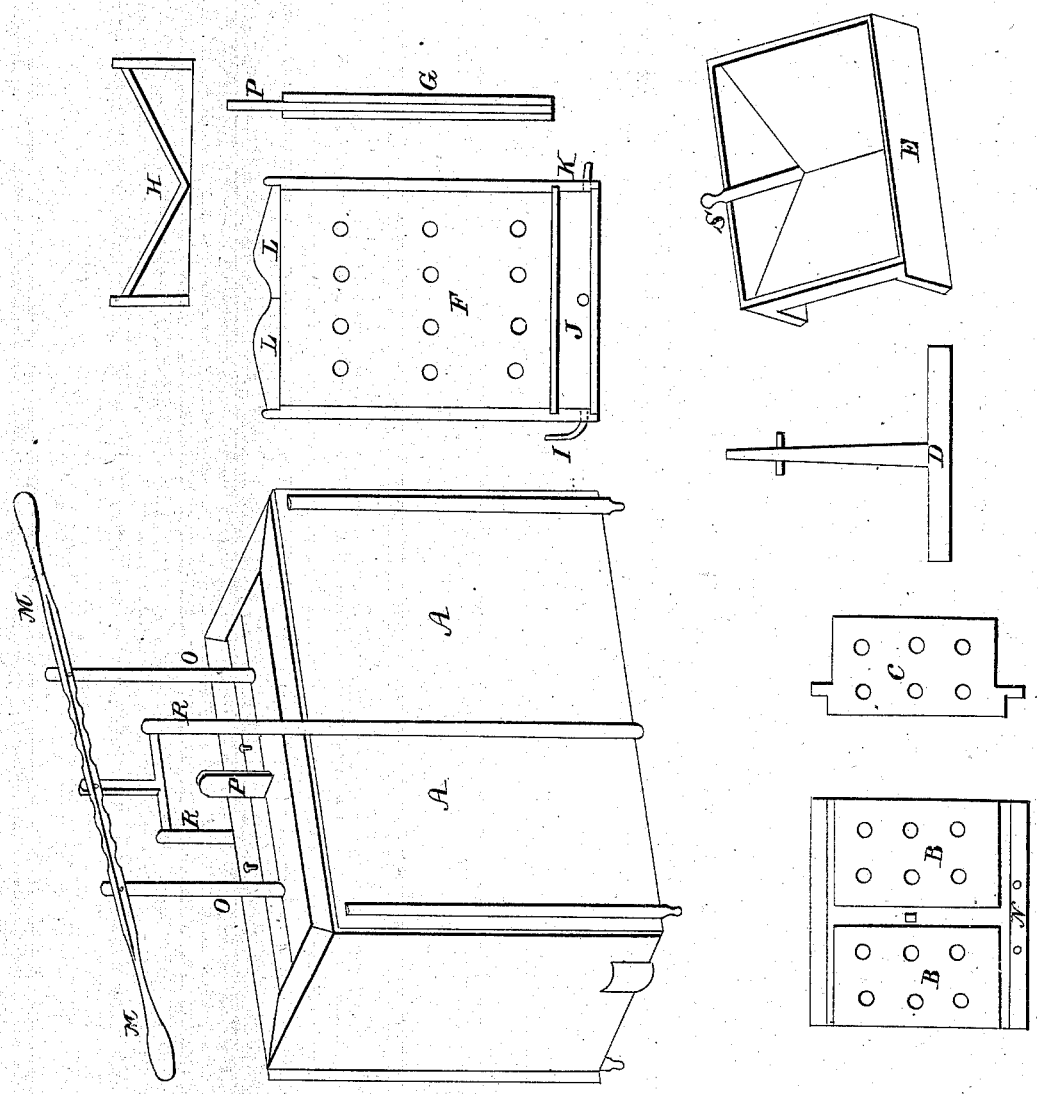
Witnesses
L. T. Smith
O. O. Gilson
Inventor
C. D. Van Allen

UNITED STATES PATENT OFFICE.

CICERO D. VAN ALLEN, OF SYRACUSE, NEW YORK.

IMPROVEMENT IN CHURNS.

Specification forming part of Letters Patent No. 35,638, dated June 17, 1862.

*To all whom it may concern:*

Be it known that I, CICERO D. VAN ALLEN, of the city of Syracuse, in the county of Onondaga and State of New York, have invented a new and useful Improvement in Churns; and I do hereby declare that the following is a full, clear, and exact description and specification of the construction and operation of the same, reference being had to the annexed drawing, making a part of this specification, in which like letters refer to like parts.

Letters A A represent the perspective view of the churn; B B, the floats attached in the frame; C, a section of a single float; D, the butter-worker; E, the face view of the butter-tray; F, a cross-section of the partitions of the churn; G, the end view of the partitions; H, the end view of the butter-tray; I, the tunnel that receives warm or cold water in the chamber for regulating the temperature of the cream; J, the end view of the chamber; K, the faucet for drawing off the water from the chamber; L L, the edge of the lids; M M, the lever; N, the frame to which the floats are attached; O O, the dash-rods; P, the handle of the regulating-slide; R R, the frame to which the lever is attached; S, the slide that passes off the water and buttermilk from the butter.

To enable others skilled in the art to make and use my invention, I will proceed to describe its construction and operation.

The body of the churn A A is made of wood, of any desired proportions, fastened to the outside, and in the middle of the churn is the frame R R, extending above the churn any desired distance, to which the lever M M is attached, extending lengthwise of the churn, of any desired length. The dash-rods O O are fastened to the lever M M. In the center of the churn, between the dash-rods O O, are placed the movable partitions F F, with holes through them, and between these is placed the regulating-slide P, with a handle passing through the lid of the churn, that when the regulating-slide P is raised up the cream or milk will pass through the partitions, and when shoved down, thereby closing the holes and stopping the cream or milk from passing through, will produce more agitation of the cream or milk. At the bottom of the dash-rods O O is the frame N, to which is attached the floats C C, with holes through them, by pivots, and the pivots are so constructed in the floats near the center that when the dash-rods O O are pressed down upon the cream or milk the floats are pressed up against the frame R R and the cream or milk is forced up through the holes of the floats, and when the floats are raised out of the cream or milk the peculiar manner in which they are attached to the frame R R causes them to drop, thereby lessening the resistance in raising the dash through the cream or milk. The dash-rods O O can be removed, and in their place may be attached the butter-worker D, for the purpose of working and salting the butter, and placed on top of the churn is the butter-tray H with a slide, S, in it that lets the water and buttermilk from the butter. The butter-worker is operated by the same power that is used in churning.

The operation of my churn is as follows: The cream or milk is poured into the churn and the lever M M is worked up and down by hand or by power with a slow motion until the butter comes, which will be in one-half the time it ordinarily takes in common dash churns. The partitions F F can be so regulated that, when the cream is thick, by raising the regulating-slide P, thereby opening the holes, will permit the cream to pass back and forth through the partitions as the churn is operated. Near the bottom of the churn is a false chamber, J. The tunnel I is intended to permit warm or cold water to be poured in the chamber for regulating the temperature of the cream or milk.

What I claim as new, and desire to secure by Letters Patent, is—

The combination and arrangement of the floats B B, the partitions F F, the regulating-slide P, and the butter-tray H, when used for the purposes specified.

C. D. VAN ALLEN.

Witnesses:
   L. F. SMITH,
   O. O. GILSON.